United States Patent
Siepker et al.

(12)
(10) Patent No.: US 6,422,663 B1
(45) Date of Patent: Jul. 23, 2002

(54) PROCEDURE FOR ALLOCATING OF BRAKING POWER

(75) Inventors: Achim Siepker, Groebenzell; Josef Manseicher, Hoehenkirchen; Hans Schmidt, Unterschleiheim, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/762,688
(22) PCT Filed: Aug. 10, 1999
(86) PCT No.: PCT/EP99/05834
§ 371 (c)(1),
(2), (4) Date: Feb. 12, 2001
(87) PCT Pub. No.: WO00/09375
PCT Pub. Date: Feb. 24, 2000

(30) Foreign Application Priority Data

Aug. 10, 1998 (DE) .......................................... 198 36 017

(51) Int. Cl.[7] .............................. B60T 7/12; B60T 8/00
(52) U.S. Cl. .................................. 303/191; 188/DIG. 1; 303/186; 303/192
(58) Field of Search ................................ 303/191, 192, 303/186, 2, 3, 20, 113.5, 187, 139, 140, 148, 22.1, 198; 188/DIG. 1, 152; 701/41–43, 48; 180/197, 446, 402, 415, 6.24, 247, 65.1–65.8

(56) References Cited

FOREIGN PATENT DOCUMENTS

| DE | 1 420 804 | 4/1969 |
|----|-----------|--------|
| DE | 196 48 174 | 5/1998 |
| EP | 0 275 985 | 7/1988 |
| EP | 0 314 641 | 5/1989 |
| EP | 0 456 097 | 11/1991 |
| EP | 0 595 510 | 5/1994 |
| JP | 7257336 | * 10/1995 |

* cited by examiner

Primary Examiner—Douglas C. Butler
(74) Attorney, Agent, or Firm—Crowell & Moring LLP

(57) ABSTRACT

A system for regulating braking power in a braking system with self-acting brake intervention wherein the wheels at the front and rear axles are stopped in the event that the vehicle is parked. The braking power ($B_{VA}$) at the wheels of the front axle is reduced during a steering operation, in order to reduce the steering power. At the same time, the braking power ($B_{HA}$) at the rear axle of the vehicle is increased, in order to safely hold the vehicle in a parked position.

6 Claims, 1 Drawing Sheet

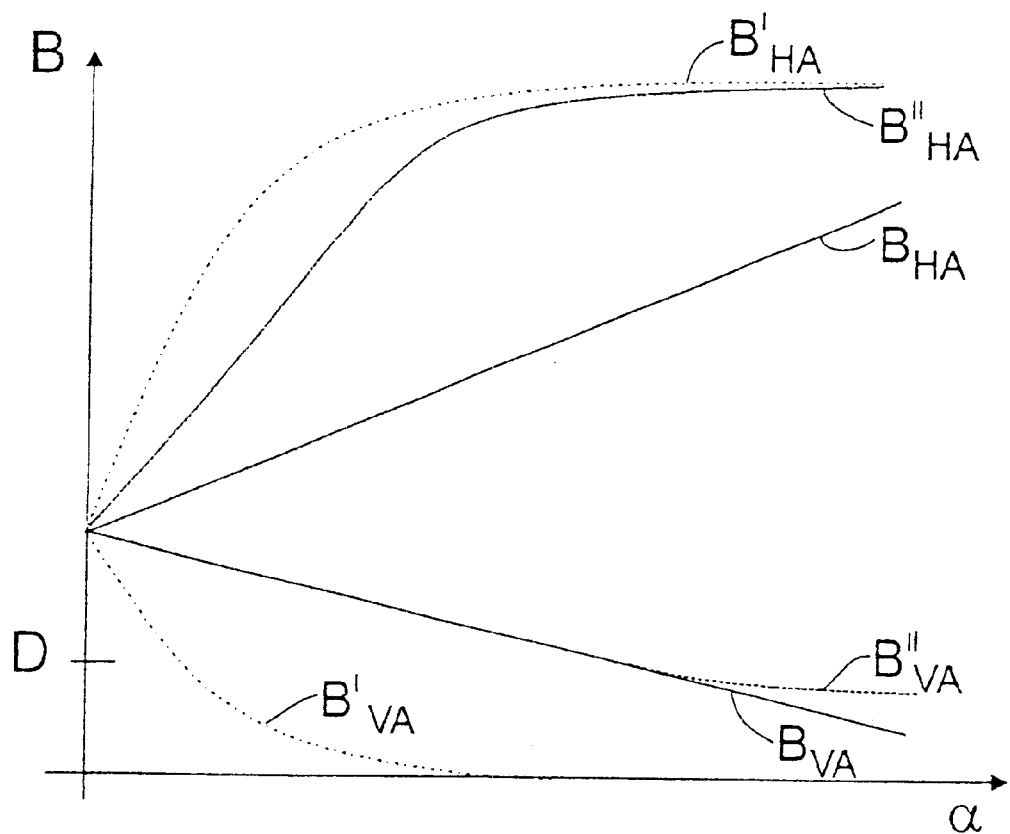

PROCEDURE FOR ALLOCATING OF BRAKING POWER

BACKGROUND AND SUMMARY OF THE INVENTION

This application claims the priority of German Patent Document 198 36 017.7 filed Aug. 10, 1998 and PCT/EP99/05834 filed Aug. 10, 1999, the disclosures of which are expressly incorporated by reference herein.

The invention concerns a procedure for allocating braking power at wheels of the front and rear axles on a vehicle coming to a stop by way of self-acting brake intervention.

On vehicles equipped with service brakes, which enable a self-acting brake intervention, several different safety and comfort functions can be realized. Such braking systems for instance, are powered electromechanically, or electrohydraulically and are preferably constructed as brake-by-wire-systems. This way, for example, a vehicle may be stopped by activation of the wheel brakes by the braking system without intervention of the driver. In order to achieve a sufficient stopping effect at the lowest possible energy deployment (i.e. for the electric engines at the wheel brakes, or for the hydraulic pump), the wheel brakes both at the front and rear axles will be activated.

If at the same time a steering maneuver on a vehicle parked in this way is being performed, an increased power demand is created for the steering motions, as would be the case with stationary, non-braked front wheels. This increased power demand must be exerted by way of an appropriate energy supply for a power-assisted or power activated steering system. Additionally, the steering system must be proportionally sized to the maximum amount of this type of steering power.

It is the object of the invention to provide a procedure which reduces the energy demand for the steering maneuver on a parked vehicle.

The main objective is to reduce the braking power on wheels of the front axle during steering motions on a fully stopped vehicle. This leads to benefits with regard to the energy demand during steering maneuvers, for instance during parking procedures. With the procedure according to the invention, a reduction of the steering power is achieved on a stationary vehicle, with the condition of the design of a power-assisted, or power activated system, which produces an increased steering power, already being critical. Therefore, the steering system can be designed proportionately weaker with beneficial results in energy absorption, weight, size, manufacturing costs, etc. The reduction in steering power is especially important in electronic power-assisted and purely power activated systems, as for instance in steer-by-wire-systems.

An intervention on the braking system of a vehicle, which depends on a steering maneuver, is generally known in the form of so-called steering brake systems for agricultural towers or such, as shown, for example, in EP 0 275 985 A, or EP 0 314 641 A. However these well known systems differ significantly from the present invention.

The procedure according to the invention may be used in all "active braking systems" that involve actuators, which can be controlled by the driver without engaging the pedals.

The reduction of the stopping power on the front axle in accordance with the invention can lead to an insufficient stopping effect on a vehicle parked on an inclined surface. Therefore it is advantageous to compensate the loss of braking power on the front axle with a simultaneous increase of the braking power on the rear axle of the vehicle, if necessary, in order to ensure a sufficient stopping effect for the vehicle as a whole.

The reduction of braking power on the front axle takes place as a function of the steering angle of the front wheels. The function between steering angle and braking power can generally be defined as desired. Depending on the steering angle, the appropriately associated steering momentum is thereby achieved. For instance, the applied braking power can be reduced on the front axle continually with an increasing steering angle, in order to continue to ease the steering procedure with sharply turned front wheels.

Additionally, it is possible to change the braking distribution depending on the changing speed of the steering angle $d\alpha/dt$, if necessary.

The inclination of the vehicle is taken into consideration with the braking distribution in order to prevent the vehicle from rolling away, in any event. Additionally, the mass of the vehicle (load, trailer operation, etc.) can be considered with the rating of the braking power. Of course, other influencing factors may be used for the rating of the braking power, as, for instance, the temperature of the braking components, vehicle-specific special features of individual models of one vehicle make, or the measure of the desired steering power assistance.

In order to increase the braking power on the rear axle in addition to the increased stopping effect on the rear axle of the vehicle it is possible to use a stopping brake system, which is usually activated only when exiting the vehicle (for instance by electromotive force). This helps to apply an increased amount of braking force on the rear axle, in order to further reduce the braking power on the front axle and therefore further reduce the steering power. A known parking brake system is exemplified by EP 0 456 097 A or EP 0 595 570.

Other objects, advantages and novel features of the present invention will become apparent from the following detailed description of the invention when considered in conjunction with the accompanying drawings.

BRIEF DESCRIPTION OF THE DRAWINGS

The sole Figure contains a diagram illustrating the distribution of braking power on the front or rear axle, respectively, of the vehicle depending on the steering angle.

DETAILED DESCRIPTION OF THE PREFERRED EMBODIMENT

The steering angle $\alpha$ of the front axle wheels is illustrated at the abscissa of the diagram and the braking Power B is illustrated at the ordinate of the diagram. Assuming a steering angle $\alpha=0$, at a braking power $B_{VA}$ at the front axle equals the braking power $B_{HA}$ at the rear axle, the braking power $B_{VA}$ is reduced at the front axle, when a steering movement is applied. At the same time, the braking power $B_{HA}$ at the rear axle is increased, with $B_{VA}$ and $B_{HA}$ being linearly connected. The course of the curve of both braking powers $B_{VA}$ and $B_{HA}$ are different from each other, in order to compensate the unevenly effective braking surfaces and/or braking power levers at the front and rear axles of the vehicle in this example.

During the continuous course of braking power $B_{VA}$, or $B_{HA}$, respectively, over the steering angle $\alpha$, this variable transfer of braking power from the front axle to the rear axle is achieved and prevents the comfort of the vehicle occupants from being compromised by reactions being felt toward the outside, or from noises.

In contrast, a step function, or at least a considerably steeper course of the curve $B_{VA}$, and/or $B_{HA}$, may, of course, be considered, in order to significantly reduce the steering powers at even small steering angles. The courses $B'_{VA}$ and $B'_{HA}$, illustrated as dotted lines, show a braking power distribution, during which the braking power $B_{VA}$ is completely reduced at relatively small steering angles $\alpha$, in order to reduce the steering powers to a maximum.

Additionally, the diagram includes the of the curve of braking power $B''_{VA}$ or $B'_{HA}$, respectively, at a vehicle's angle of inclination, $\beta>0$ (illustrated as a dashed line). Here, increased parking power is necessary, as opposed to the parking power on a vehicle being parked on an even pavement, in order to prevent the vehicle from rolling. A reduction of the braking power $B_{VA}$ at the front axle with value D is not possible, as the applicable braking power $B_{HA}$ at the rear axle alone would not be sufficient to safely hold the vehicle in a parked position. Alternatively, an additional braking power, instead of the minimum power D at the front axle, may be applied by way of an independently operating parking brake device. Alternatively, instead of the minimum power D at the front axle, an additional braking power at the rear axle may be applied by way of an independently operating parking brake device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating braking power to wheels of a front axle and wheels of a rear axle of a stopped vehicle, comprising the steps of:

detecting that said vehicle is stopped by action of a self-acting brake intervention;

detecting a steering motion of wheels of said front axle;

reducing braking power at said front axle when said steering motion is detected; and increasing a braking power at the rear axle at the same time as the step of reducing a baking power at the front axle in order to compensate for the reducing of braking power at the front axle.

2. The method according to claim 1, wherein each of said braking power of said front axle and the braking power of said rear axle are a function of the steering angle of the wheels of the front axle.

3. The method according to claim 2, wherein the braking power of the front axle is continuously reduced with an increase in said steering angle and wherein the braking power of the rear axle is continuously increased with an increase in said steering angle.

4. The method according to claim 1, wherein the regulation of the braking power of said front axle and said rear axle is a function of an angle of inclination of said vehicle.

5. The method according to claim 1, wherein a distribution of the braking power is a function of the mass of the vehicle.

6. The method according to claim 1, wherein at least a portion of braking power at the rear axle results from the use of a parking brake device.

* * * * *